No. 753,843. PATENTED MAR. 8, 1904.
W. C. BETTS.
ICE CREAM CUTTER OR SCRAPER.
APPLICATION FILED JULY 10, 1903.
NO MODEL.

Witnesses

Inventor
William C. Betts.
By
Thomas P. Simpson.
Attorney

No. 753,843. Patented March 8, 1904.

UNITED STATES PATENT OFFICE.

WILLIAM C. BETTS, OF SEYMOUR, INDIANA.

ICE-CREAM CUTTER OR SCRAPER.

SPECIFICATION forming part of Letters Patent No. 753,843, dated March 8, 1904.

Application filed July 10 1903. Serial No. 164,989. (No model.)

*To all whom it may concern:*

Be it known that I, WILLIAM C. BETTS, a citizen of the United States, residing at Seymour, in the county of Jackson and State of Indiana, have invented new and useful Improvements in Ice-Cream Cutters or Scrapers, of which the following is a specification.

The special object of the invention is to make a device which may be held within an ice-cream freezer at a suitable distance above the cream, so that the surplus cream which comes up on the mold or dipper may be scraped off and made to fall back into the freezer without sticking to the side thereof or to the edge of the mold or dipper. I thus save cream, promote cleanliness, and lessen subsequent manual labor.

Figure 1:
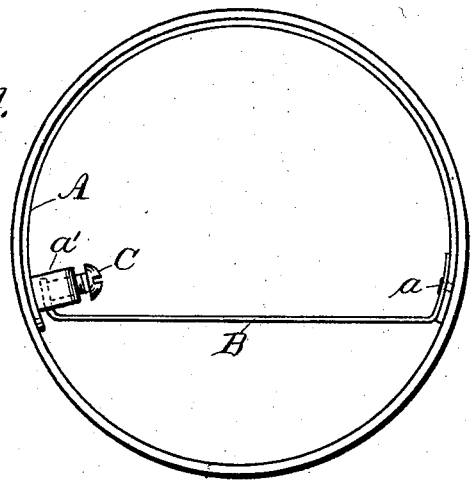
Figure 2:
Figure 3:
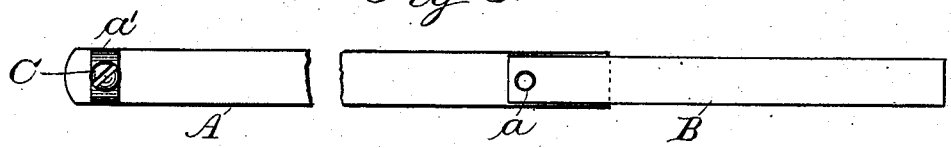

Figure 1 is a plan view of a scraper in the freezer. Fig. 2 is an enlarged end view of the spring and scraper in section under the clamp-screw; Fig. 3, a fragmentary plan view of the flat scraper.

In the drawings, A represents the flat spring whose outside presses against the inside of the freezer, so as to hold the knife in place.

B is the wire or flexible flat cutter or scraper which goes across the inside of freezer above the cream. Its terminals are secured to the ends of the spring A, one end rigidly by a rivet $a$ and the other end by a clamp-screw C, so as to be detachable or adjustable. The screw is held in the loop $a'$ of the band-spring A. Thus it will be readily seen that the cutter or scraper goes straight across the interior of the freezer and forms the chord of a circle, thus leaving an open space between itself and the inside of the freezer. Through this space passes the scrapings of cream to the cream below without sticking to the side of freezer or edge of the mold or dipper. The mold or dipper when it is raised from the cream in the freezer is drawn across the cutter or scraper.

I am aware that United States Patent No. 433,090 shows a brush-wiper formed of a wire with a vertical hook; that United States Patent No. 642,346 shows a wire with a spiral and bent at each end as a brush-wiper; also, that United States Patent No. 571,438 shows a compressor to squeeze them between spring-bars; but the construction and purpose of these is different from mine. My scraper is flexible to conform to the shape of mold or dipper.

I am aware that neither a scraper nor a spring-holder is broadly new or patentable; but

What I claim as my invention, and desire to protect by Letters Patent, is—

A new article of manufacture consisting of the flat spring A and flexible flat blade or scraper B, the ends of the latter being connected with those of the former, to form the circumference of a space through which the mold or dipper may freely pass up and down in an ice-cream freezer as and for the purpose described.

In testimony whereof I have signed my name to this specification in the presence of two subscribing witnesses.

WILLIAM C. BETTS.

Witnesses:
 FRANK L. KRUWEL,
 A. C. BRANAMAN.